Oct. 11, 1960  G. E. NICHOLS ET AL  2,955,545
DECELERATOR
Filed April 16, 1957  7 Sheets-Sheet 1

Fig.1

George E. Nichols
Gordon A. Nelson
Donald C. Watts
INVENTORS:

Hubert E. Metcalf
Their Patent Attorney

George E. Nichols
Gordon A. Nelson
Donald C. Watts
INVENTORS

Their Patent Attorney

Oct. 11, 1960 G. E. NICHOLS ET AL 2,955,545
DECELERATOR
Filed April 16, 1957 7 Sheets-Sheet 6

George E. Nichols
Gordon A. Nelson
Donald C. Watts
INVENTORS:

By Herbert E. Metcalf
Their Patent Attorney

United States Patent Office 2,955,545
Patented Oct. 11, 1960

2,955,545
DECELERATOR

George E. Nichols, La Canada, Gordon A. Nelson, Los Angeles, and Donald C. Watts, Calabasas, Calif., assignors to Northrop Corporation, Hawthorne, Calif., a corporation of California Filed Apr. 16, 1957, Ser. No. 653,110

8 Claims. (Cl. 104—178)

This invention has to do with a decelerator which may, in broad terms, be defined as a track base and integral seat sled combination.

The increasing speed of aircraft is continually presenting human as well as mechanical component force problems for which the aero-medical division of aeronautics, as well as engineers, strive to provide an answer. A vigilant effort is being made to measure the human, or animate, and inanimate object tolerance to forces and to development of satisfactory safety systems.

An object of this invention is to provide a decelerator in the nature of track base and integral seat sled combination that will sufficiently illustrate the human tolerance to forces.

Another object of this invention is to provide a decelerator in the nature of a track base and integral seat sled combination that will provide a base and basis for testing certain force-restraint equipment that may be applied to the human factor for his protection.

A yet further object of this invention is to provide a decelerator whereby tolerable forces may be demonstrated, to the human factor, that are representative of forces that do, and will, actually occur under the varying circumstances of flying an aircraft or driving a vehicle.

A still further object of this invention is to provide a decelerator that may be used for the purpose of testing instruments, aircraft, and aircraft components and subjecting the same to forces of such intensity as to determine their reliability to actual operations.

Another object of this invention is to provide a decelerator in the nature of a track base and integral seat sled combination which has a novel method of propelling the seat sled along the track from adjacent one end to the other.

A further object of this invention is to provide a decelerator with a variable system of braking the seat sled to a relatively abrupt stop with the result that forces of varying magnitude may be applied.

A yet further object of this invention is to provide a decelerator in the nature of a track base and integral seat sled combination that has a novel method of "cocking" the seat sled and holding the same in a cocked position until time to release.

Another object of this invention is to provide a decelerator in the nature of a track base and integral seat sled combination that has a novel arrangement of track engaging rollers.

Broadly the invention comprises spaced apart, parallel tracks attached to a body or foundation. A seat-platform-sled arrangement having a novel system of rollers is mounted on the tracks. An elastic shock cord is attached to the seat-platform-sled arrangement and means is provided, due to space limitations, for preloading the cord. A cable system is provided for fully loading the shock cord and for "cocking" the sled or placing the same in a position whereby it may be propelled from adjacent one end of the track to the other. A releasable trip or lever holds the sled in a cocked position until it is desired to release the same. When the sled is released it is propelled into a braking system that will bring the sled to a relatively abrupt stop. The acceleration and deceleration forces may be varied in several ways by either altering the forces imposed by the brakes or by varying the pre-load position of the shock cord, or both.

Figure 1:
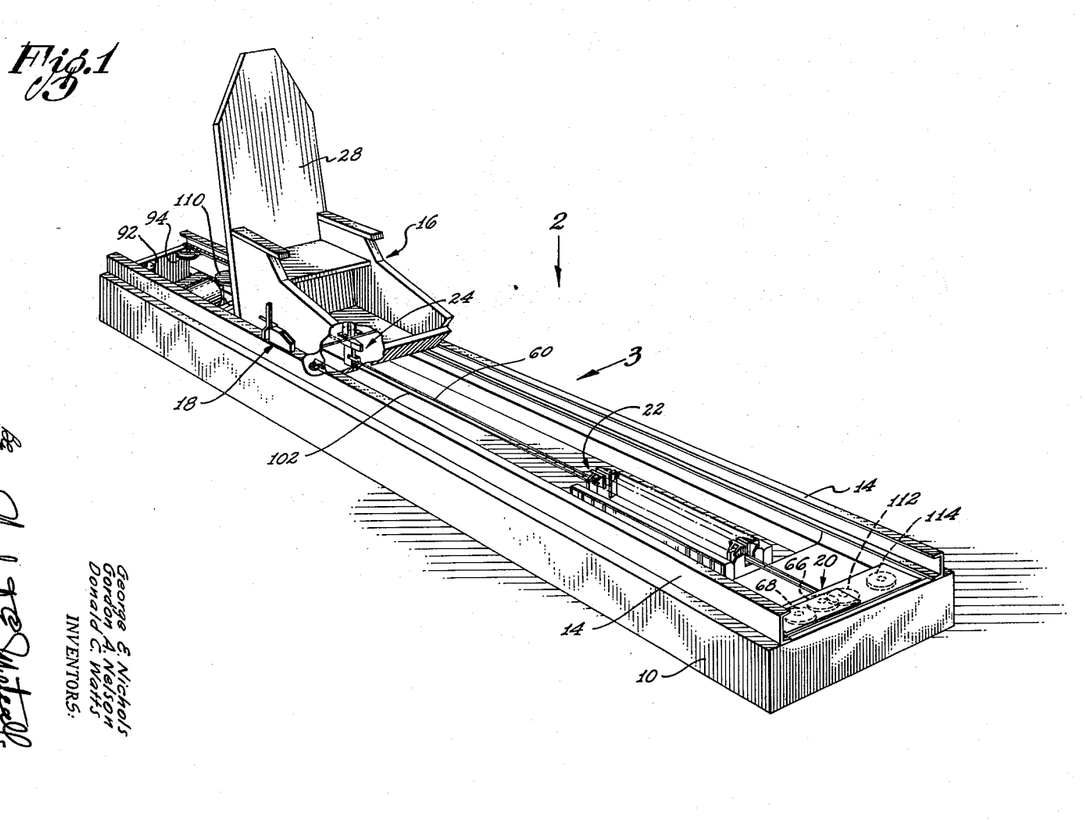
Figure 1 is a fragmentary perspective view of the decelerator illustrating a track base and integral seat-platform-sled combination; certain structure being shown schematically.

Referring to the drawings for a more detailed description of the present invention 10, in Figure 1, designates a base or foundation. A pair of spaced apart, parallel tracks 14 are secured to the base. There is provided a seat-platform-sled assembly broadly designated 16 that is mechanically associated with the tracks. Mounted on one of the tracks 14 near the rear end thereof is a release lever and latch unit broadly designated 18 that restrains or releasably holds the sled in a "cocked" position. A cord-cable-chain system broadly designated 20 is provided for the purpose of propelling the sled from adjacent one end of the track to adjacent the other end. Provision is made to stop the travel of the sled 16 which consists of a bank of brakes broadly designated 22 and a brake actuator broadly designated 24.

Attention is directed to Figures 14 to 17 inclusive wherein details of the seat-platform-sled structure and configuration may be seen.

Figures 14, 15:
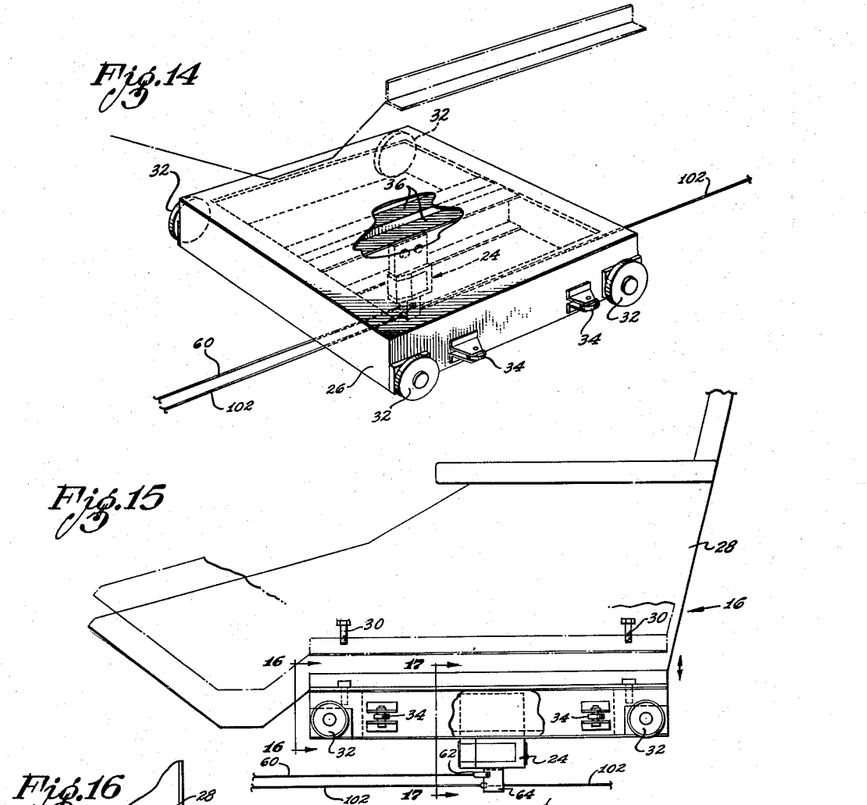
Figure 14 is a fragmentary, perspective view of the platform of the seat-platform-sled arrangement and illustrating schematically, in dotted line, the brake actuator and braces therefor.
Figure 15 is a fragmentary side elevation view of the seat-platform-sled arrangement, illustrating one method of attaching and removing the seat from the platform.
Figures 16, 17:
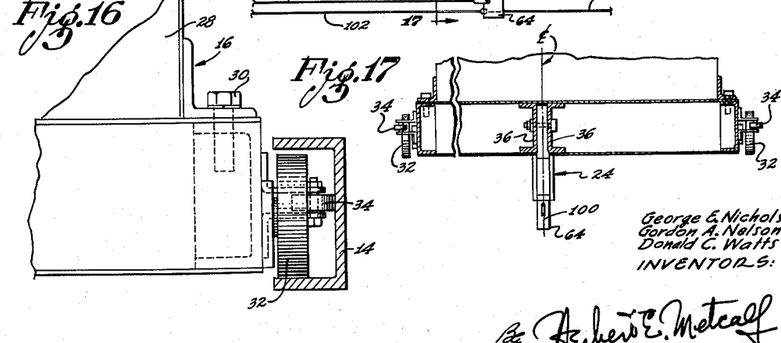
Figure 16 is an enlarged, cross-sectional view taken on line 16—16 of Figure 15 looking in the direction indicated.
Figure 17 is a cross-sectional view taken on line 17—17 of Figure 15 looking in the direction indicated.

The platform 26 has the seat 28 releasably attached thereto by fasteners 30. Although in the present instance the fasteners 30 are illustrated as being bolts, any type of fasteners may be used and the seat may be attached to the platform in any manner. The platform 26 and the seat 28 provide two means for performing tests involving the human factor and various instruments. For instance, the various types of seats having any number of configurations may be tested to determine their suitability in the environment to which they are to be applied. Restraining harness, of the type used in aircraft and automobiles may be tested using the seat in combination with an articulated dummy or a human being. Other devices may be tested in combination with the seat. On the other hand, the seat 28 may be removed and the platform 26 may be used as a test bed to test various instruments and the like.

A track engaging roller 32 is located at each corner of the platform 26. Additionally, there is provided guide rollers 34 that engage the bight of the U-shaped tracks 14.

Attention is directed to the fact that the brake actuator 24 is centrally secured to the platform 26. It may be determined by referring to Figure 17 that a pair of spaced U-shaped braces 36 are a part of the platform and that the brake actuator 24 is inserted between the braces and bolted or releasably fastened in place.

Figures 8, 9, 10:
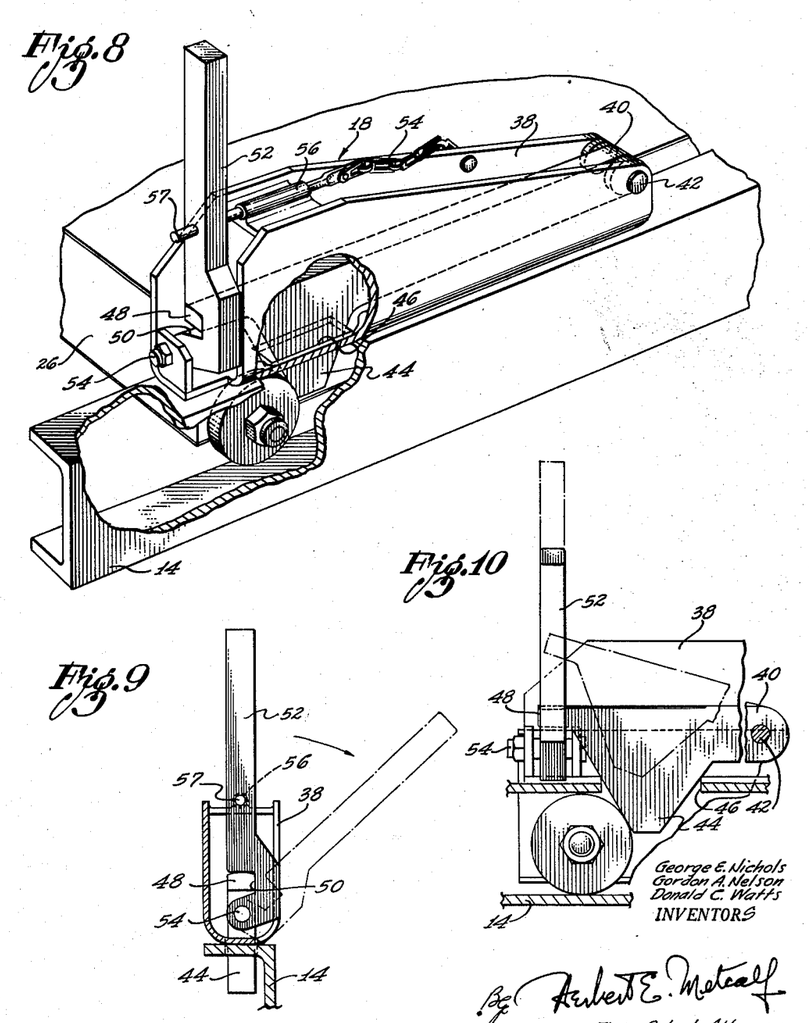
Figure 8 is a fragmentary perspective view illustrating the release lever and latch that is provided for holding the sled in a cocked position.
Figure 9 is an end elevation of the release lever and latch illustrating in phantom line, the position of the lever when the sled has been released from the cocked position.
Figure 10 is a slide elevation view of the trip lever and latch illustrating in phantom line the position the cocking dog or cam assumes when the sled is released from the cocked position.

Figures 8 to 10 inclusive illustrate the release lever and latch unit 18. An elongated U-shaped housing 38 having an irregular exterior configuration is secured to one track 14 in any suitable manner. A latch lever 40 is pivotally attached to the housing at 42. This lever has a cam or dog 44 adjacent the free end thereof that projects through an opening 46 in the track 14. Further, the lever 40 has a projection 48 on the extreme free end that is received in a notch, cup or receptacle 50 of a manually actuated release lever 52. The lever 52, as may readily be determined, is also pivoted to housing 38 at 54.

A tubular member 56 on the housing 38, receives a rod 57. This rod extends through an opening in the hand lever 52 which prevents accidental release of the lever. The rod is made captive by having a chain 54 secured thereto and the chain is in turn riveted or fastened to the housing in the manner illustrated.

The operation of the release lever and latch is as follows: The sled 16 is pulled into the cocked position as illustrated in Figure 1. One wheel 32 engages, or passes under, the cam to lift the same out of the track. The cam or dog 44 drops in place when the wheel is on the rearward side. The receptacle 50 of the lever 40 is made to receive the projection 48 and as a result the sled 16 is locked in a cocked position.

The cable-cord-chain system, of cocking the sled 16, identified by the numeral 20 is illustrated in detail in Figures 1, 2, 3, 18 and 19. The system 20 may be further divided by considering part of it as an elastic shock cord system broadly designated 56 and a cocking cable system broadly designated 58.

The elastic shock cord system 56 will be the first to be described. It begins with a cable 60 having an adaptor 62 thereon that is fastened to a projection 64 that is part of the brake actuator 24, Figures 2, 6, 14 and 15. The cable 60 extends toward the forward end of the tracks 14 and is threaded about a pair of pulleys 66 and 68 that are rotatably mounted on the base 10. The cable is then attached to an elastic shock cord 78 through the medium of a coupling 80. The shock cord is threaded about a pulley 82 at the rear of the tracks 14. From pulley 82 the shock cord 78 extends forward and lies on a pulley 84 and is threaded about a pulley 86. Another coupling 88 secures the shock cord to another cable 90. Cable 90 is threaded over a pulley 92 at the rear of the tracks and across the back of the base to a pulley 94. From pulley 94 the cable 90 is rolled upon the drum of a manually or hand operated winch 96.

Figures 18, 19:
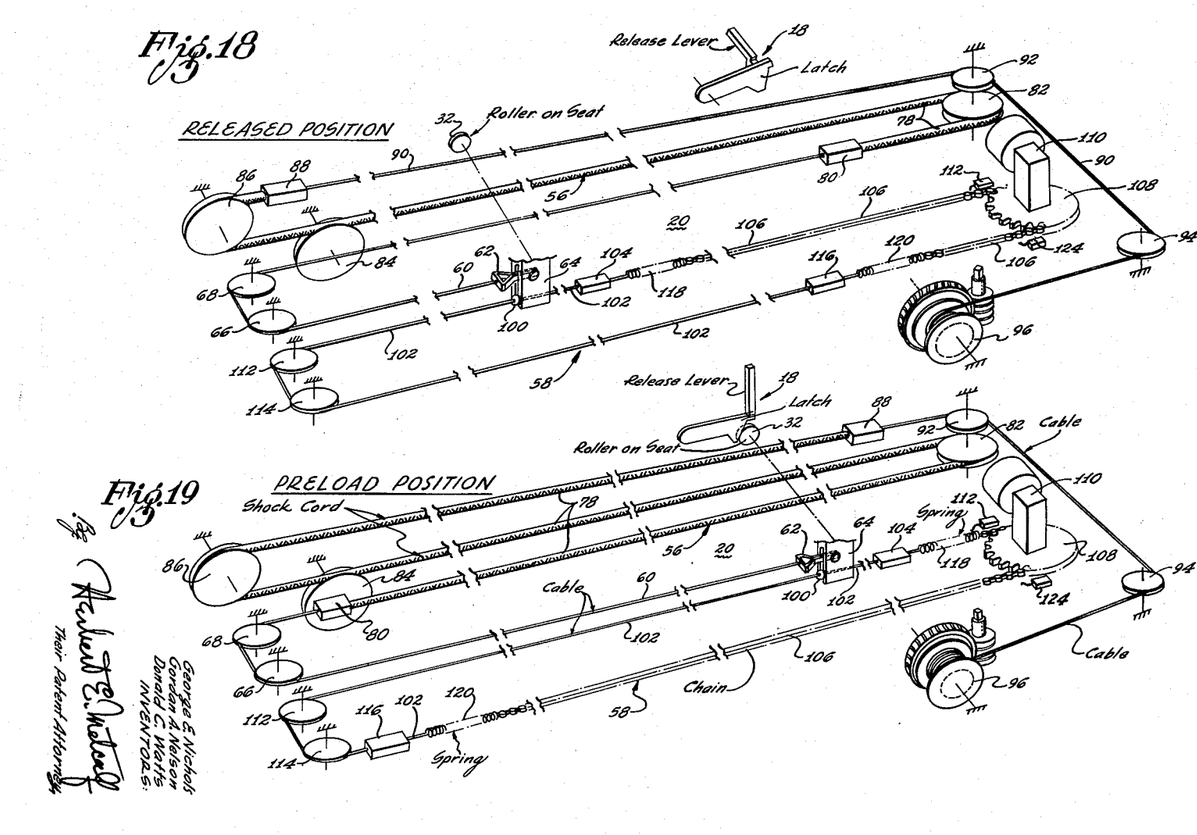
Figure 18 is a schematic illustration of various decelerator components, shock cord system, and cocking cable system in the released, uncocked or unloaded position.
Figure 19 is a schematic illustration of various decelerator components, shock cord system, cocking cable system, in the fully loaded or cocked position.

Attention is directed to Figures 18 and 19 and the position of the shock cord 78 as illustrated therein. The couplings 80 and 88 will more particularly show the position the elastic shock cord assumes in the released and preloaded positions. In order for the sled to be propelled at the desired velocity the shock cord is stretched to any one of an infinite number of preload positions.

It is to be noted, that the amount of preloading of the shock cord is limited by the couplings 80 and 88 for the reason they cannot pass around pulleys 92, 86, 68 and 82.

The cocking cable system 58 is an endless cable-chain arrangement that is threaded about a number of pulleys and/or sprockets and is operated by a winch.

Figures 4, 5, 6, 7:
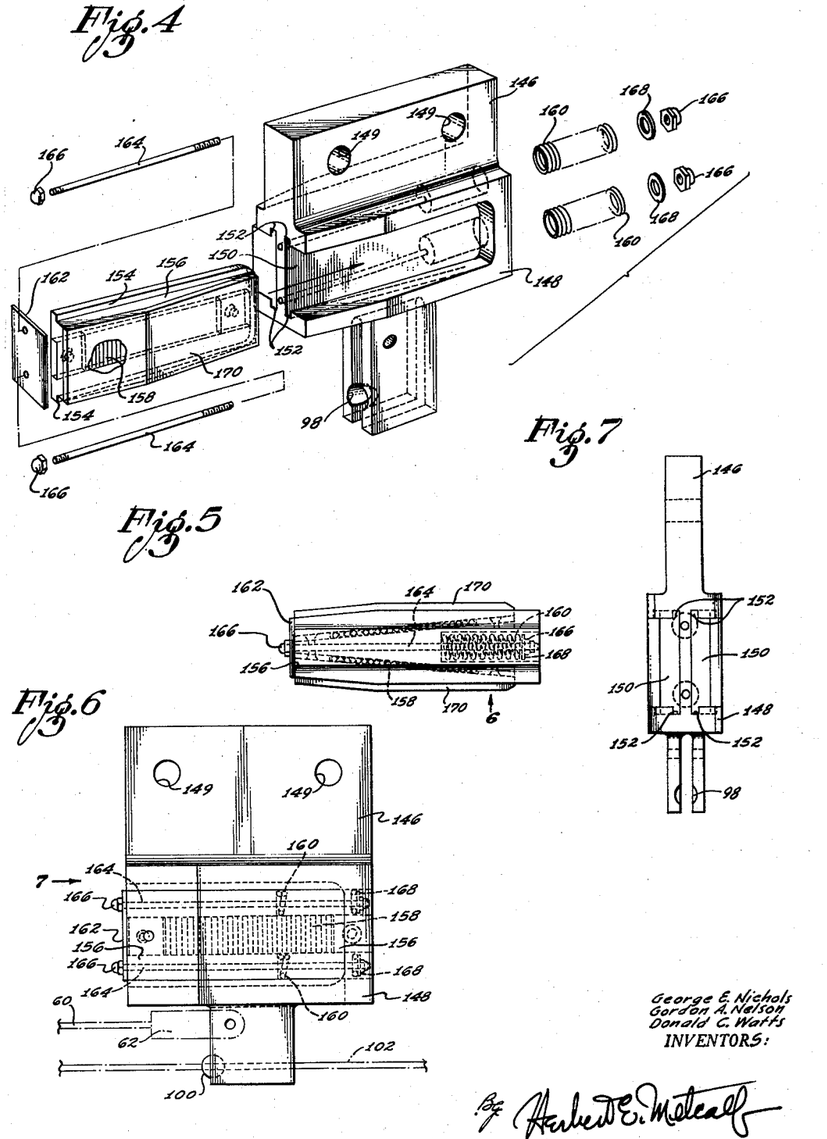
Figure 4 is an exploded, perspective view illustrating the brake actuator.
Figure 5 is a plan elevation view of the brake actuator illustrating, in dotted line, certain component structure.
Figure 6 is a side elevation view looking in the direction indicated by the arrow bearing the numeral 6 as seen in Figure 5.
Figure 7 is an end elevation view looking in the direction indicated by the arrow bearing numeral 7 as seen in Figure 6.

Again attention is directed to the projection 64 on the brake actuator 24, Figure 4. This projection has a semispherical recess 98 formed in the forward edge thereof. This recess is adapted to receive a ball 100 that is swaged on cable 102, Figure 6. To the rear of the ball or projection 64 the cable is coupled, as illustrated at 104, to a chain 106. The chain is threaded about a sprocket wheel 108 of an electrically actuated winch 110. Forward of the ball, the cable 102 is threaded about a pair of pulleys 112 and 114 and through the medium of a coupling 116 is again secured to the chain 106.

Attention is directed to the fact that between each coupling 104 and 116 and the sprocket wheel 108 there is about and secured to the chain 106 springs 118 and 120. Each of these springs engage at alternate times switches 112 and 124 that automatically turns off the power to the winch 110. For instance, the operation is as follows: Assume the elastic shock cord 78 is in the preload position as previously described. The ball 100 is made to engage projection 64 by actuating the winch 110 to rotate the cable system 58 about the pulleys. When the ball engages the recess 98 the sled 16 is pulled to the rear of the tracks 14. At the same time the coupling 116 is moving forward toward pulley 114, and coupling 104 is pulled toward sprocket wheel 108. Before either coupling can become enmeshed in either the sprocket wheel or pulley the spring 118 engages switch 112 to shut off operation of the winch 110. However, with the ball 100 still engaged in the recess 98 the sled 16 cannot be released to be propelled toward the forward end of the track 14. The winch 110, however, is capable of being operated in a direction opposed to that for cocking the sled. The sled, of course, is restrained by the release lever and latch 18. The ball 100 on the cocking cable system 58 is moved, through the medium of winch 110, toward the forward end of the tracks 14. But before the ball 100 can become jammed or enmeshed in pulley 112 the spring 120 engages switch 124 to again shut off power to the winch 110.

Figure 2:
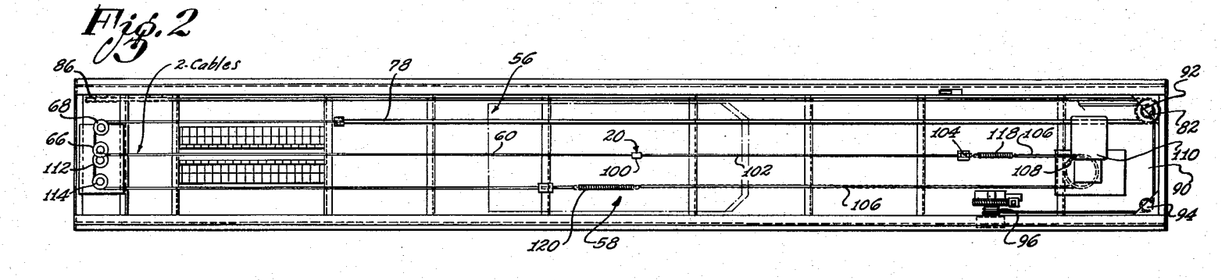
Figure 2 is a plan view looking in the direction indicated in Figure 1 by the arrow bearing the numeral 2 as seen in Figure 1 and illustrating the track base and component parts with the sled removed.
Figure 3:
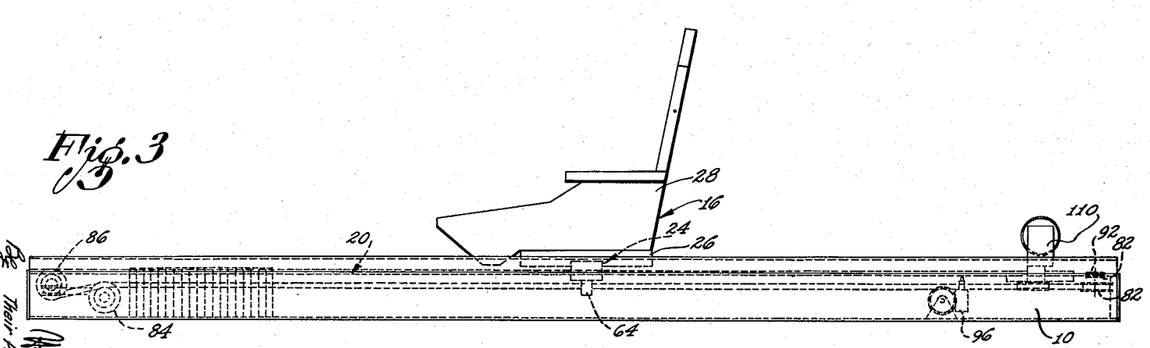
Figure 3 is a side elevation view looking in the direction indicated in Figure 1 by the arrow bearing the numeral 3 as seen in Figure 1.

It is to be noted that in Figure 2 cable 60 appears to be a part of cable 102. The reason for this is that cable 102 is directly under cable 60.

As previously stated, once the sled 16 is propelled along the track, provision must be made to stop it short of leaving the tracks 14. The bank of brakes 22 in combination with the brake actuator 24 performs the braking function.

Figure 11:
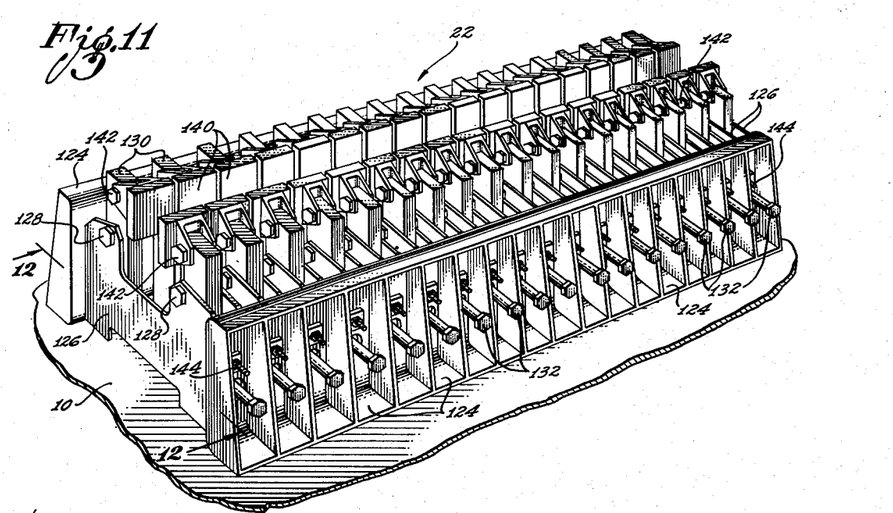
Figure 11 is a perspective view illustrating the bank of brakes that is provided for stopping the sled.
Figure 12:
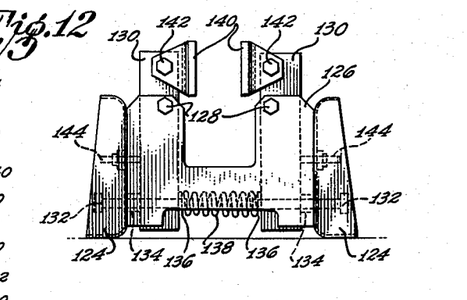
Figure 12 is a view taken on line 12—12 of Figure 11 and illustrating one set of brakes.
Figure 13:
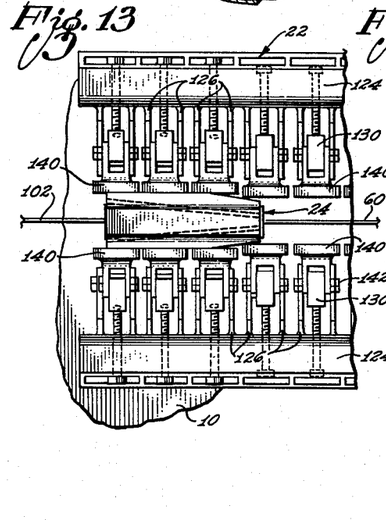
Figure 13 is a plan elevation view illustrating the brake actuator as it would appear in the bank of brakes.

Details of the brakes may be seen in Figures 11 to 13 inclusive. A pair of spaced apart, elongated, parallel, supports 124 are secured to the base 10 in any suitable manner. A series of lever supports 126 are located between supports 124. There are a pair of supports for each set of brakes. Pivoted at 128 to each support are a pair of spaced apart levers 130. Each lever adjacent the lower end, has an opening therein into which is threaded an elongated bolt 132.

Between each lever 130 and each support 124 and about each bolt 132 is a spacer bushing 134. Additionally each bolt 132 has a washer or spring seat 136 retained on the end thereof and between each seat of each opposed pair of bolts is a spring 138. On the upper free end of each lever 130 is a brake pad 140 that may be adjusted or positioned about axis 142. Between each pad 140 and each bolt 132, for each lever 130, and extending through the supports 124 is a lever stop 144. Adjusting of the bolts 132 results in increasing or decreasing the force necessary to cause the levers 130 to pivot about their axis.

Briefly, the operation of the bank of brakes 22 is as follows: When the brake actuator 24 is urged between the brakes in the manner illustrated in Figure 13, the actuator engages the pads 140 and urges the levers 130 to rotate about their axes 128, and off the stops 144. As a result the compression force of the springs 138 is transmitted to the brake actuator 24 which results in braking the sled 16 to a stop.

Finally, the details of the brake actuator 24 are to be considered, Figures 4 to 7 inclusive. The projection 64 has been fully described. Opposed to the projection is a tongue 146, having a pair of bolt receiving holes 149 therein, that fits between the braces 36 of the platform 26.

Between the tongue 146 and the projection 64 and integral with each is a body 148 that has a pair of recessed areas 150 that are inclined in such a manner that the apex is at the forward edge. A pair of opposed channels 152 are located adjacent each face and these channels are adapted to receive flanges 154 that are integral with the brake shoes 156. The channels 152 and the flanges 154 permit the brake shoe 156 to slide in a reciprocable path of travel.

Each brake shoe 156 has a pocket therein into which a plurality of rollers 158 are placed. It is to be noted that the pocket is not entirely filled with rollers, but that a space is provided whereby the rollers 158 may translate when the shoes 156 slide.

The body 148, at the rear, has a pair of openings into each of which is inserted a coil or compression spring 160.

The shoes 156 are prevented from sliding off the forward end of the body 148 and the springs 160 are prevented from being dislodged from the body by a plate 162 that is attached to the body by elongated studs 164. The studs extend through the body 148 and springs 160 in the manner illustrated in Figures 4, 5 and 6, and are retained in place by nuts 166 and washers 168. The washers 168 as well as the body 148 provide seats for the springs 160.

Each brake shoe 156 has a material or lining 170 on the exterior surface that provides a high coefficient of friction when in contact with brake pads 140.

Attention is directed to the fact that the brake actuator 24 is tapered in order that it will enter the bank of brakes 22. Additionally, the length of the brake actuator body 148 and shoes 156 are longer than the width of the brake pads 140. This difference in dimensions provides a greater friction surface on the brake shoe that may engage the brake pads 140. This difference in dimensions and area of contact may be seen by referring to Figure 13.

The operation of the brake actuator 14 is as follows: The brake actuator 24 enters the bank of brakes 22 in the manner illustrated in Figure 13 of the drawing. The brake lining or material 170 on the shoes 156 engages the pads 140 and the resultant friction in combination with the pressure urged by the springs 138 through the pads 140 on the brake actuator stops the sled 16.

However, the brake actuator is so thoroughly wedged in the bank of brakes 22 and the pressure urged by the brakes against the actuator is so great that the sled 16 cannot be returned to the rear of the tracks 14 in the absence of some way of relieving or releasing the pressure. Under the present circumstances when the attempt to pull the sled 16 out of the bank of brakes 22 is initiated the body 148 slides on rollers 158, toward the rearward end of the tracks 14, in opposition to the springs 160. Friction tends to retain the shoes 156 in the wedged position. However, the combination of movement of body 148, the inclined areas 150, the rollers 158, and the friction results in the shoes 156 converging to relieve the pressure which in turn results in levers 130 again seating on stops 144. When the brake actuator 24 is removed from the bank of brakes 22 the springs 160 urge the shoes 156 back into the position illustrated in Figures 5 and 6.

Briefly, the entire operation of the decelerator is as follows: The seat-platform sled 16 is cocked and the cord-cable-chain system 20 is caused to function in the manner previously described. The release lever and latch unit 18 releasably retains the sled 16. When it is desired the unit 18 is actuated and the sled 16 is propelled down the tracks 14. The brake actuator 24 being integral with sled 16 is propelled into the bank of brakes 22 and the sled is stopped. The brake actuator 24 and sled 16 are removed from the bank of brakes in the manner previously described.

There is one way of varying the velocity of the sled 16 and that is to vary the preload position of the elastic shock cord 78. There are two ways of varying the decelerating force of the sled. One is to vary the length of the brake actuator. The other way is to vary the imposed force of the brake spring 138 by adjusting the bolts 132.

While in order to comply with the statutes the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A decelerator comprising an elastic cord system one end of which is connected to an object, the opposed end being threaded over a winch adapted to partially preload said elastic cord system; an endless cable system having an element thereon that releasably engages said object; and a winch engaging said endless cable system adapted to apply a force to said elastic cable system to position the latter in a fully loaded position and move said element into contact with said object when actuated in one direction and thereby functioning to move said object to a loaded position, and further functioning to move said element from said object when actuated in the other direction; said elastic cord system when released from the fully loaded position thereof functioning to impart a positive rate of acceleration to said object; latch and release mechanism adapted to respectively retain and release said elastic cord system in and from the fully loaded position thereof; and fixed structure engaged by said object that brakes said object to a stop when said object is propelled from the loaded position thereof to an unloaded position.

2. A decelerator comprising an elastic cord system one end of which is connected to an object, the opposed end being threaded over a winch adapted to partially preload said elastic cord system; an endless cable system having an element thereon that releasably engages said object; and a winch engaging said endless cable system adapted to apply a force to said elastic cable system to position the latter in a fully loaded position and move said element into contact with said object when actuated in one direction, and functioning to move said element from said object when actuated in the other direction; said elastic cord system when released from the fully loaded position thereof functioning to impart a positive rate of acceleration to said object; latch and release mechanism adapted to respectively retain and release said elastic cord system in and from the fully loaded position thereof; a brake shoe on said object; and a fixed bank of brakes engaged by said brake shoe to stop said object.

3. In a decelerator having a pair of spaced tracks and a shock cord system adapted to propel an object from a position at one end of said tracks to a position at the opposite end thereof at a positive rate of acceleration, a braking system comprising at least one brake assembly including individual opposing brakes which are spaced apart and spring loaded in a direction urging said individual brakes in a direction toward each other; a support connected to and projecting from said object; and a pair of spring loaded members connected to said support that engages said brakes and cooperates with said brake assembly to arrest the positive acceleration of said object.

4. In a decelerator having a pair of spaced tracks and a shock cord system adapted to propel on object from a position at one end of said tracks to a position at the opposite end thereof at a positive rate of acceleration, a braking system comprising at least one brake assembly including individual opposing brakes which are spaced apart and spring loaded in a direction urging said individual brakes in a direction toward each other; a support connected to an projecting from said object and having a pair of tapered sides; and a pair of members connected to said support which are spring loaded and reciprocably mounted for movement with respect to said support that engages said brake assembly and cooperates with said brake assembly to arrest the positive acceleration of said object.

5. In a decelerator having a pair of spaced tracks and a shock cord system adapted to propel and object from a position at one end of said tracks to a position at the opposite end thereof at a positive rate of acceleration, a braking system comprising at least one brake assembly including individual opposing brakes which are spaced apart and spring loaded in a direction urging said individual brakes in a direction toward each other; a support connected to and projecting from said object and having a pair of tapered sides; a pair of members, each having a pocket formed therein; said members being mounted on said support and being spring loaded for reciprocable movement with respect to said support and functioning to engage said brake assembly; and a series of rollers in said pockets that are in rolling contact with said tapered sides at such times as said members engage said brakes.

6. A decelerator comprising an elastic cord-cable-chain system that cocks and propels an object from one area to another area at a positive rate of acceleration; a brake assembly comprising spaced opposed banks of brakes; and a brake actuator on said object that enters said opposed banks of brakes to actuate the latter to bring the object to a stop; said opposed banks of brakes comprising a series of individual brakes each having a pair of opposed spring loaded levers and pads that rotate relative to each other in opposition to the spring forces.

7. A decelerator comprising an elastic cord-cable-chain system that cocks and propels an object from one area to another area at a positive rate of acceleration; a brake assembly comprising spaced opposed banks of brakes; and a brake actuator on said object that enters said opposed banks of brakes to actuate the latter to bring the object to a stop; said brake actuator having a pair of reciprocable and opposed brake engaging shoes.

8. A decelerator comprising an elastic cord-cable-chain system that cocks and propels an object from one area to another area at a positive rate of acceleration; a brake assembly comprising spaced opposed banks of brakes; and a brake actuator on said object that enters said opposed banks of brakes to actuate the latter to bring the object to a stop; said elastic cord-cable-chain system comprising an elastic shock cord system and a cocking cable system.

References Cited in the file of this patent

UNITED STATES PATENTS

| | | |
|---|---|---|
| 1,777,167 | Forbes | Sept. 30, 1930 |
| 1,963,081 | Fellers et al. | June 19, 1934 |